United States Patent
Paudel et al.

(10) Patent No.: US 10,901,713 B2
(45) Date of Patent: Jan. 26, 2021

(54) OPTIMIZING PROGRAM PARAMETERS IN MULTITHREADED PROGRAMMING

(71) Applicant: International Business Machines Corporation, Armonk, NY (US)

(72) Inventors: Jeeva Paudel, North York (CA); Alexander Brandt, London (CA); Marc Moreno Maza, London (CA); Linxiao Wang, London (CA)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 16/375,005

(22) Filed: Apr. 4, 2019

(65) Prior Publication Data

US 2020/0319864 A1 Oct. 8, 2020

(51) Int. Cl.
G06F 8/41 (2018.01)
G06F 8/77 (2018.01)

(52) U.S. Cl.
CPC ............... G06F 8/443 (2013.01); G06F 8/45 (2013.01); G06F 8/77 (2013.01)

(58) Field of Classification Search
None
See application file for complete search history.

(56) References Cited

U.S. PATENT DOCUMENTS

| 8,122,441 | B2 | 2/2012 | Barsness et al. |
| 8,627,300 | B2 | 1/2014 | Kruglick |
| 2011/0191128 | A1* | 8/2011 | Chao ................... G06Q 10/063 705/7.11 |
| 2011/0191143 | A1* | 8/2011 | Chao ................. G06Q 10/0637 705/7.36 |
| 2011/0191351 | A1* | 8/2011 | Chao ...................... G06F 16/00 707/748 |
| 2013/0086565 | A1* | 4/2013 | Gaster ...................... G06F 8/41 717/148 |

(Continued)

OTHER PUBLICATIONS

Ryoo et al., *Program Optimization Space Pruning for a Multithreaded GPU*, Proceedings of the 6th annual IEEE/ACM international symposium on Code generation and optimization (CGO'08), Apr. 2008, pp. 195-204, ACM New York, NY, USA, DOI: 10.1145/1356058.1356084.

(Continued)

*Primary Examiner* — Qing Chen
(74) *Attorney, Agent, or Firm* — Jason H. Sosa

(57) ABSTRACT

Optimizing program parameters in multithreaded programming may include: generating, for a program, a plurality of low-level metric functions, each of the low-level metric functions calculating a respective low-level metric of a plurality of low-level metrics; generating one or more high-level metric functions for one or more high-level metrics, each of the one or more high-level metric functions comprising a piecewise-rational function based on one or more of the low-level metric functions; and generate, based on the one or more high level-metric functions, one or more data parameter values and one or more hardware parameter values, one or more program parameter values for executing the program, wherein the one or more program parameter values are configured to optimize the one or more high-level metrics.

20 Claims, 6 Drawing Sheets

(56) References Cited

U.S. PATENT DOCUMENTS

| | | | | |
|---|---|---|---|---|
| 2014/0068573 A1* | 3/2014 | Brewis | ............... | G06F 9/449 717/140 |
| 2014/0297340 A1* | 10/2014 | Akkiraju | ......... | G06Q 10/06395 705/7.11 |
| 2014/0297373 A1* | 10/2014 | Akkiraju | ............ | G06Q 10/06 705/7.41 |

OTHER PUBLICATIONS

Ryoo et al., *Optimization Principles and Application Performance Evaluation of a Multithreaded GPU Using CUDA*, Proceedings of the 13th ACM SIGPLAN Symposium on Principles and practice of parallel programming (PPoPP'08), Feb. 2008, pp. 73-82, ACM New York, NY, USA, DOI: 10.1145/1345206.1345220.

\* cited by examiner

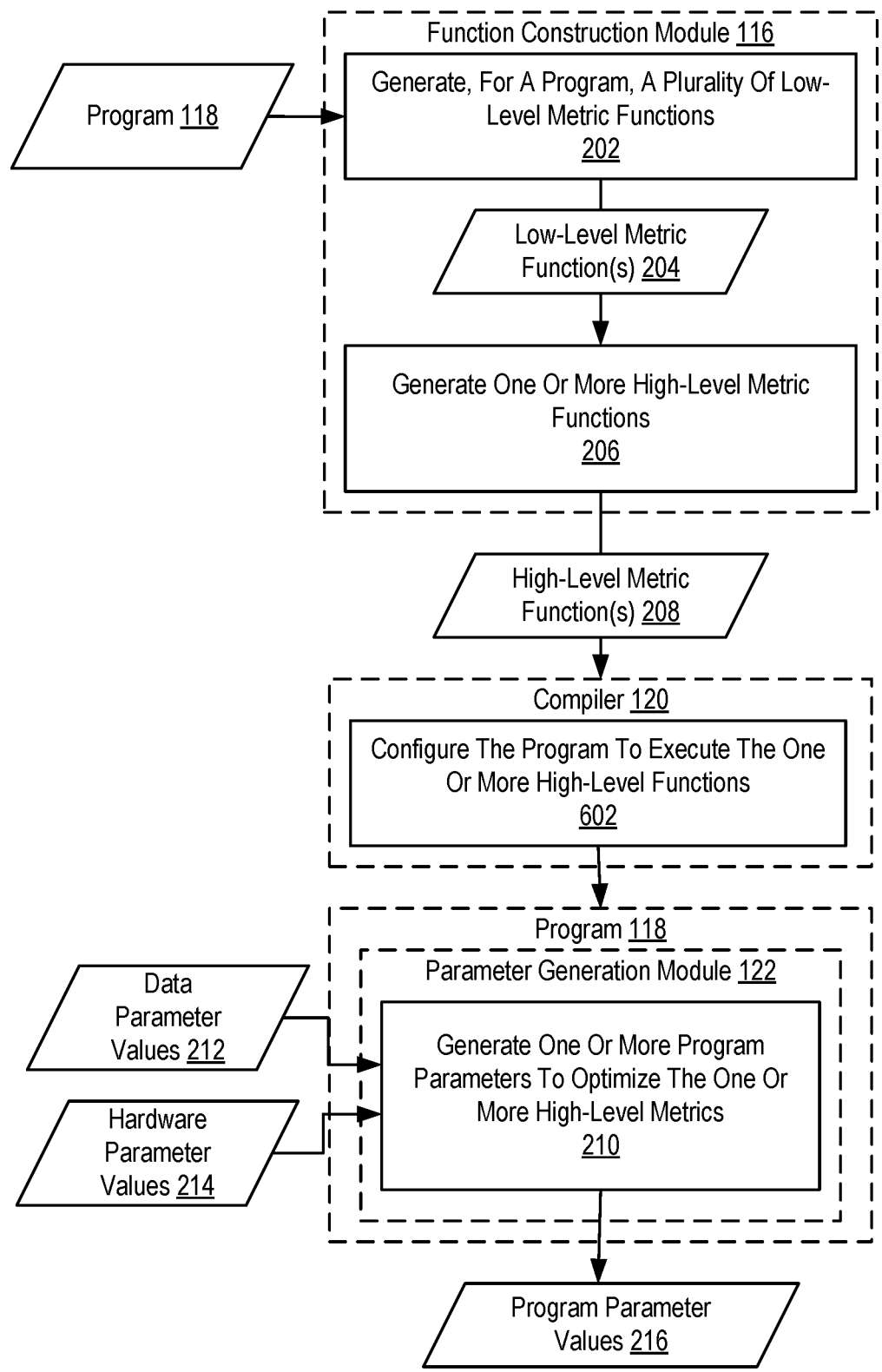

OPTIMIZING PROGRAM PARAMETERS IN MULTITHREADED PROGRAMMING

BACKGROUND

Field of the Invention

The field of the invention is data processing, or, more specifically, methods and apparatus for optimizing program parameters in multithreaded programming.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The performance of a multithreaded execution of a program may be dependent on multiple parameters. Data parameters comprise the input data or workload that the program is processing. Hardware parameters comprise the characteristics of the physical hardware resources available to the program (e.g., available processors, memory, registers, etc.). Program parameters describe the partitioning and distribution of data and computations to execute the program, including the granularity of work and the degree of parallelism used (e.g., a number of threads executed, a number of threads per processor or block, vectorization factor, loop unrolling factor, etc.).

Approaches exist for optimizing program parameters in order to optimize the overall performance of a program. For example, models may be generated for a particular input workload or hardware configuration. However, such models require entirely new models to be generated for each unique workload or hardware configuration. Interfaces can be presented for user tuning of program parameters, but such approaches require manual input and user judgment in tuning the particular program parameters. Moreover, existing approaches take into account a relationship between low-level metrics and high-level metrics are constrained or limited in that they need to consider an exhaustively large number of low-level metrics even to estimate one high-level performance metric. Also, they are unable to model the holistic relationship between program parameters, data parameters, hardware parameters, and low-level metrics for a given program without the above listed limitations (i.e., they either require precise input training data, or are applicable to only one workload, hardware, or rely on auto-tuning or manual tuning).

SUMMARY

Optimizing program parameters in multithreaded programming may include: generating, for a program, a plurality of low-level metric functions, each of the low-level metric functions calculating a respective low-level metric of a plurality of low-level metrics; generating one or more high-level metric functions for one or more high-level metrics, each of the one or more high-level metric functions comprising a piecewise-rational function based on one or more of the low-level metric functions; and generate, based on the one or more high level-metric functions, one or more data parameter values and one or more hardware parameter values, one or more program parameter values for executing the program, wherein the one or more program parameter values are configured to optimize the one or more high-level metrics.

Advantages provided by such embodiments for optimizing program parameters in multithreaded programming include determining program parameter values optimizing the execution of a program at run-time using parameters that may only be determined at run-time, including data parameter values for the workload of the program and hardware parameter values for the computing system executing the program. Furthermore, as hardware parameters are treated as symbolic values of functions used for calculating program parameters, the approaches described herein may be applied to any potential hardware configuration. Furthermore, the generated high-level metric functions may be used on any hardware configuration independent of the system used to generate the functions themselves.

In an optional embodiment, generating the plurality of low-level metric functions may include: executing, for a plurality of parameter combinations, a respective instance of the program; determining, for each respective instance of the program, a plurality of low-level metric values for the plurality of low-level metrics; and determining, based on each plurality of low-level metric values, the plurality of low-level metric functions. This provides the advantage of being able to generate, on a single system, low-level metric functions and high-level metric functions based on many possible configurations without the need for input training data.

In an optional embodiment, optimizing program parameters in multithreaded programming may include determining the plurality of parameter combinations based on one or more data parameter descriptions allow for low-level metric functions and high-level metric functions to be generated without actual input data parameter values. Instead, the functions can be generated using only descriptions of what data would be acted on. This provides the advantage of, where a program may use sensitive or potentially confidential data, the program may be optimized without exposing this potentially sensitive or confidential information.

In an optional embodiment, generating the one or more high-level functions comprises generating, based on one or more high-level function templates, the one or more high-level functions provides the advantage of using known parameter-independent relationships between low-level metrics and high-level metrics to generate parameter-dependent high-level metric functions for optimizing program parameter values.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6 is a flowchart of an example method for optimizing program parameters in multithreaded programming.

DETAILED DESCRIPTION

Figure 1:
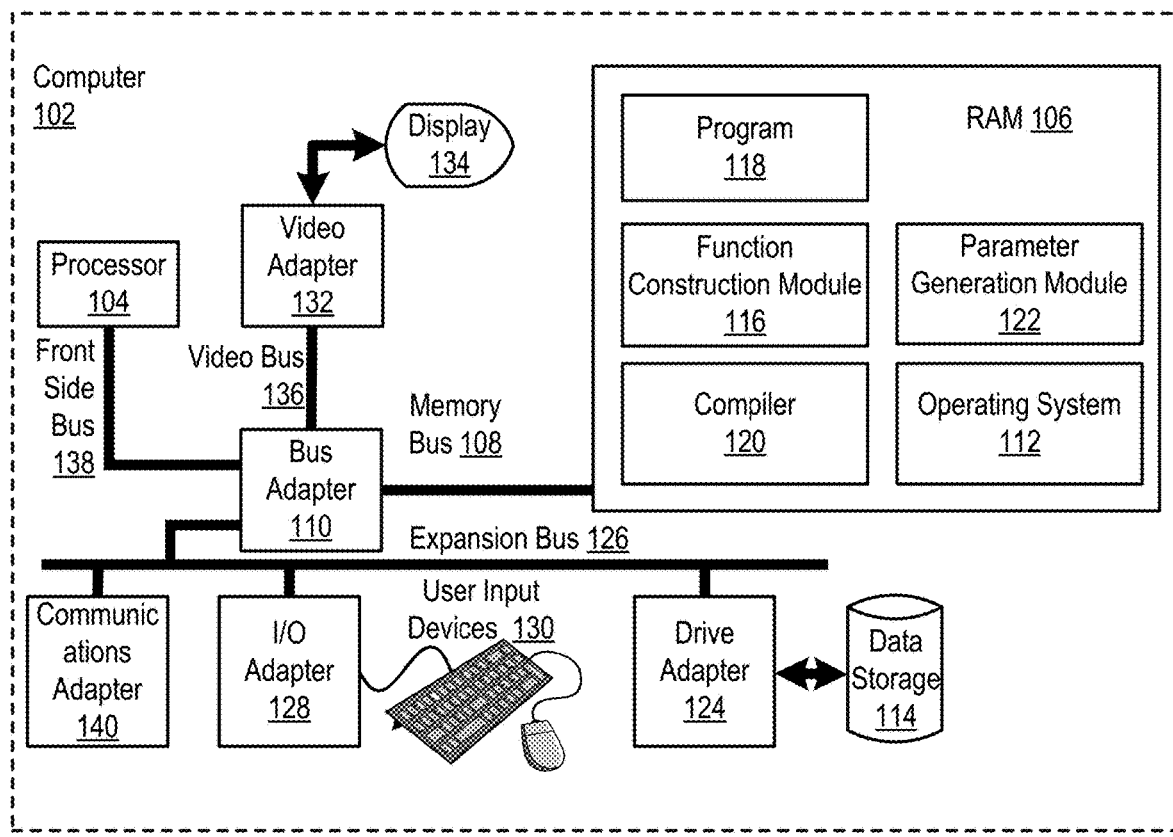
FIG. 1 is a block diagram of a computer configured for optimizing program parameters in multithreaded programming.

The performance of a multithreaded execution of a program may be dependent on multiple parameters. Data parameters comprise the input data or workload that the program is processing. Hardware parameters comprise the characteristics of the physical hardware resources available to the program (e.g., available processors, memory, registers, etc.). Program parameters describe the partitioning and distribution of data and computations to execute the program, including the granularity of work and the degree of parallelism used (e.g., a number of threads executed, a number of threads per processor or block, vectorization factor, loop unrolling factor, etc.).

Examples of hardware parameters can include, for example:
Maximum number of registers per thread block.
Maximum number of shared memory words per thread block.
Maximum number of threads per thread block.
Maximum number of thread blocks per multiprocessor.
Maximum number of warps per multiprocessor.
The number of multiprocessors on the device.
Bandwidth between memory and processing cores.
Clock frequency of a processor.
Number of bytes for each warp.
Number of threads per warp.
Number of cycles to execute one instruction.
Memory access latency.
Delay between two uncoalesced memory transactions.
Delay between two coalesced memory transactions.

Data parameters and hardware parameters are independent of the program parameters, and are instead based on the needs of the workload to be processed and the hardware configuration of the system executing the program. However, the program parameters are dependent on the data parameters and hardware parameters. Thus, performance of the program on a given workload using a given hardware configuration can be optimized by determining optimal values for the program parameters.

Performance of a program can be considered optimized by maximizing or minimizing one or more high-level metrics (e.g., execution time, memory consumption, hardware occupancy). A high-level metric comprises a measured performance metric of a program execution relative to the system as a whole or relative to an aggregation of hardware components. In other words, a high-level metric comprises a metric that is functionally dependent on a plurality of low-level metrics. Low-level metrics measure the activity of a particular hardware component. Examples of low-level metrics can include:
Number of registers used per thread.
Number of shared memory words used per thread block.
Number of memory transactions per warp for uncoalesced access.
Total dynamic total of synchronization instructions per thread.
Number of coalesced memory type instructions per thread.
Number of uncoalesced memory type instructions per thread.
Total dynamic number of memory instructions per thread.
Total dynamic number of computation instructions per thread.
Total dynamic number of instructions per thread.
Number of active thread blocks per processor.
Number of active warps per processor.
Computation period—the average time between two consecutive memory instructions in a warp.
Memory-waiting period—the time period from after one warp sends memory requests until all the memory requests from that same warp are serviced.
Execution time of a thread-block measured in clock cycles.
Execution time of a warp measured in clock cycles.
Time waiting for memory requests measured in clock cycles.
Number of threads per block.

A program's performance (e.g., measured according to high-level metrics) is typically dominated by a small number of low-level metrics. In order to optimize a program according to one or more high-level metrics, a plurality of low-level metric functions can be generated for a particular program. Each of the low-level metric functions can accept, as input, one or more data parameter values, one or more hardware parameter values, and one or more program parameter values and calculate, as output, a low-level metric. Given the functional relationships between low-level metrics and high-level metrics, one or more high-level metric functions can then be generated based on the plurality of low-level metric functions. Each resulting high-level metric function comprises a piecewise rational function (PRF) of one or more of the plurality of low-level metric functions. The resulting high-level functions would thus accept, as input, one or more data parameter values, one or more hardware parameter values, and one or more program parameter values and calculate, as output, a high-level metric value.

Given particular data parameters and hardware parameters, program parameters can then be generated to maximize or minimize the high-level metric calculated by the function. For example, given a function $E=f(H, D, P)$, where E is a high-level metric, f is the high-level metric function, H is one or more hardware parameters, D is one or more data parameters, and P is one or more program parameters, P can be determined as the one or more program parameters that maximize or minimize E.

Optimizing program parameters in multithreaded programming in accordance with the present invention is generally implemented with computers, that is, with automated computing machinery. For further explanation, therefore, FIG. 1 sets forth a block diagram of automated computing machinery comprising an exemplary computer 102 configured for optimizing program parameters in multithreaded programming according to embodiments of the present invention. The computer 100 of FIG. 1 includes at least one computer processor 104 or 'CPU' as well as random access memory 106 ('RAM') which is connected through a high speed memory bus 108 and bus adapter 110 to processor 104 and to other components of the computer 100.

Stored in RAM 106 is an operating system 112. Operating systems useful in computers configured for optimizing program parameters in multithreaded programming according to embodiments of the present invention include UNIX™, Linux™, Microsoft Windows™, AIX™ IBM's iOS™, and others as will occur to those of skill in the art. The operating system 112 in the example of FIG. 1 is shown in RAM 106, but many components of such software typically are stored in non-volatile memory also, such as, for example, on data storage 114, such as a disk drive. Also stored in RAM is the function construction module 116 a module for optimizing program parameters in multithreaded programming according to embodiments of the present invention.

The function construction module 116 is configured to generate, for a program 118, a plurality of low-level metric functions calculating a respective low-level metric of a plurality of low-level metrics. The low-level metrics comprise a performance metric describing the operation of a particular hardware component during execution of the program 118. The program 118 comprises an application or service executable on the computer 102. Accordingly, the program 118 may be embodied as source code compilable by a compiler 120 configured to convert source code into an executable binary. Although the function construction module 116 is shown separate from the compiler 120, it is understood that the function construction module 116 may be a component of the compiler 120, or a subroutine or service accessible to the compiler 120.

The function construction module 116 may accept, as input, a program 118, a list of hardware parameters, a description of data parameters, a list of high-level metrics, and/or a list of program parameters to optimize. Any of these inputs aside from the program 118 may be user-specified or defined by default.

Generating, for the program 118, the plurality of low-level metric functions may comprise executing, for a plurality of parameter combinations, a respective instance of the program. Each of the plurality of parameter combinations may comprise a distinct combination of data parameters, hardware parameters, and program parameters for executing the instance of the program. The plurality of parameter combinations may be randomly generated, selected from a pool of predefined parameter combinations, or otherwise generated. For example, determining the plurality of parameter combinations may be based on one or more data parameter descriptions. The one or more data parameter descriptions may indicate one or more attributes or constraints for data parameter values. Thus, the data parameter values in the plurality of parameter combinations may be determined according to these attributes or constraints of the data parameter descriptions. Examples of data parameter descriptions may include dimensionality of data (e.g., 1-dimensional, 2-dimensional), types of data (e.g., integers, floats, doubles), ranges of data (e.g., a range of numbers), and sparseness of data (e.g., sparse or non-sparse).

Executing, for the plurality of parameter combinations, a respective instance of the program may comprise emulating one or more computing devices comprising different emulated hardware configurations (e.g., different emulated hardware configurations corresponding to the hardware parameter values of the parameter combinations). Thus, the program 118 will be executed for each of the emulated hardware configurations according to the parameter combinations. Executing a respective instance of the program may comprise compiling (e.g., by the compiler 120) the program 118 into an intermediate representation for execution (e.g., by an emulated instance of a computing device).

Generating, for the program 118, the plurality of low-level metric functions may comprise determining, for each respective instance of the program, a plurality of low-level metric values for the plurality of low-level metrics. For example, the function construction module 116 can sample (e.g., during execution of the program) or calculate (e.g., after execution of the program) the plurality of low-level metric values or perform static analysis of the source code of the user program to compute the low-level metric values.

Generating, for the program 118, the plurality of low-level metric functions may then comprise determining, based on each of the plurality of low-level metric values, the plurality of low-level metric functions. As an example, for a given low-level metric, the low-level metric values can be mapped or graphed to the program parameter values, data parameter values, and hardware parameter values (e.g., the parameter combinations) used to execute the respective instance of the program. A function can then be mapped (e.g., using numeric analysis, curve fitting, or rational interpolation) to the low-level metric values to generate a low-level metric function. The resulting low-level metric function provides, for the program 118, a functional relationship between data parameters, hardware parameters, and program parameters and the low-level metric.

After generating the plurality of low-level metric functions, the function construction module 116 may generate one or more high-level metric functions for one or more high-level metrics. Each of the one or more high-level metric functions comprises a piecewise-rational function based on one or more of the low-level metric functions. For example, a high-level metric function for calculating hardware occupancy may comprise a piecewise rational function of the low-level metric functions used to calculate the number of registers used per thread and the number of shared memory words used per thread block.

Generating the one or more high-level metric functions may comprise generating, based on one or more high-level function templates, the one or more high-level functions. A high-level function template may describe the functional relationship (e.g., dependencies) of low-level metrics on high-level metrics. For example, a high-level metric H may be expressed using the function $H=f(L_1 \ldots L_n)$, where $L_1$-$L_n$ are low-level metric values. The high-level function template may express this functional relationship independent of a particular program 118. Accordingly, generating a high-level metric function may comprise substituting the low-level metric values $L_1$-$L_n$ with the generated low-level metric functions generated specific to the program 118. Thus, the resulting high-level metric function is specific to the program 118 and accepts, as input, one or more hardware parameter values, one or more data parameter values, and one or more program parameter values and calculates, as output, a high-level metric value.

The generated high-level metric functions may then be included (e.g., encoded in, provided to, or otherwise made accessible to) a parameter generation module 122 for optimizing program parameters in multithreaded programming. The parameter generation module 122 is configured to generate, based on the one or more high-level metric functions (e.g., generated by the function construction module), one or more data parameter values (e.g., for a workload or input to the program 118), and one or more hardware parameter values (e.g., describing a computer 102 executing the program 118 and the parameter generation module 122), one or more program parameter values for executing the program 118, wherein the one or more program parameter values are configured to optimize the one or more high-level metrics.

The parameter generation module 122 may comprise an executable or module separate from the program 118 and/or the function construction module 116. For example, the function construction module 116 may be configured to generate the parameter generation module 122 based on the determined high-level metric functions. The parameter generation module 122 may also comprise a component of the program 118. For example, the function construction module 116 may encode the parameter generation module 122 as source code or other functionality of the program 118. The parameter generation module 122 may also comprise a subroutine accessible by the compiler 120 to encode the program parameter values as default values in a compiled instance of the program 118 or a run-time library. Embodiments where the parameter generation module 122 is distinct from the function construction module 116 (e.g., where the parameter generation model 122 is an executable or code generated by the function construction module 116) provide the advantage of being able to generate the high-level functions for program parameter optimization in one computing system (e.g., a distributor, developer, or other entity) to create a portable and distributable parameter generation module 122 executable on other systems (e.g., end-user systems).

The one or more high-level metrics may be selected by a user on execution of the program (e.g., as a user input). The one or more high-level metrics may also be predefined or selected as default high-level metrics that may be subsequently overridden (e.g., based on a user input, configuration, preference, etc.). Generating the one or more program parameter values may comprise generating the one or more program parameters to minimize or maximize a high-level metric calculated by a respective high-level metric function. Whether the high-level metric should be minimized or maximized may depend on the high-level metric. For example, an execution time may be minimized, while a hardware occupancy may be maximized. Where the high-level metrics comprise a plurality of high-level metrics (e.g., the program parameter values are generated to optimize a plurality of high-level metrics), the program parameter values may be generated based on a weighting or tiering of importance of the high-level metrics, or according to other rules.

For example, assuming a high-level metric function H=f($D_1$-$D_n$, $H_1$-$H_n$, $P_1$-$P_n$), as $D_1$-$D_n$, $H_1$-$H_n$ are known at run-time of the program 118, the parameter generation module 122 may solve for program parameters $P_1$-$P_n$ to maximize or minimize H. The resulting program parameter values provide for optimized execution of the program 118 for the specific hardware configuration and workload at runtime. The program 118 may then be executed using the generated program parameters (e.g., by the operating system 112). For example, the parameter generation module 122 may execute a kernel or operating system call indicating the generated program parameters. As another example, the parameter generation module 122 may provide the generated program parameters as arguments or other inputs to the program 118.

The computer 102 of FIG. 1 includes disk drive adapter 124 coupled through expansion bus 126 and bus adapter 110 to processor 104 and other components of the computer 102. Disk drive adapter 124 connects non-volatile data storage to the computer 102 in the form of data storage 114. Disk drive adapters useful in computers configured for optimizing program parameters in multithreaded programming according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 102 of FIG. 1 includes one or more input/output ('I/O') adapters 128. I/O adapters implement user-oriented input/output through, for example, software drivers and computer hardware for controlling output to display devices such as computer display screens, as well as user input from user input devices 130 such as keyboards and mice. The example computer 102 of FIG. 1 includes a video adapter 132, which is an example of an I/O adapter specially designed for graphic output to a display device 134 such as a display screen or computer monitor. Video adapter 132 is connected to processor 104 through a high speed video bus 136, bus adapter 110, and the front side bus 138, which is also a high speed bus.

The exemplary computer 102 of FIG. 1 includes a communications adapter 140 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for optimizing program parameters in multithreaded programming according to embodiments of the present invention include modems for wired dial-up communications, Ethernet (IEEE 802.3) adapters for wired data communications, and 802.11 adapters for wireless data communications.

Figure 2:
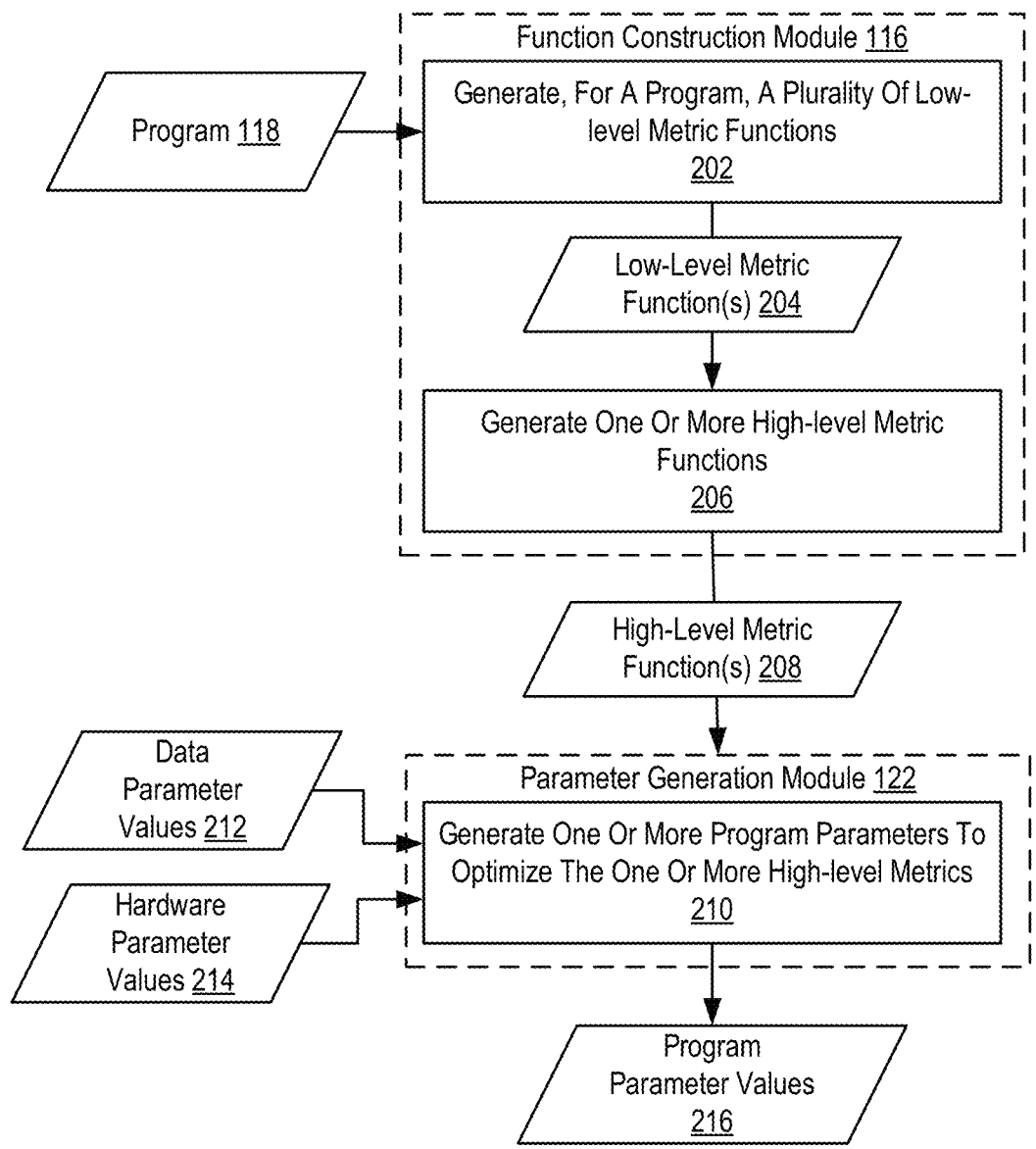
FIG. 2 is a flowchart of an example method for optimizing program parameters in multithreaded programming.

For further explanation, FIG. 2 sets forth a flow chart illustrating an exemplary method for optimizing program parameters in multithreaded programming according to embodiments of the present invention that includes generating 202 (e.g., by a function construction module 116), for a program 118, a plurality of low-level metric functions 202, each of the low-level metric functions 204 calculating a respective low-level metric of a plurality of low-level metrics. The low-level metrics comprise a performance metric describing the operation of a particular hardware component during execution of the program 118. The program 118 comprises an application or service executable on the computer 102. Accordingly, the program 118 may be embodied as source code compilable by a compiler 118 configured to convert source code into an executable binary. Although the function construction module 116 is shown separate from the compiler 120, it is understood that the function construction module 116 may be a component of the compiler 120, or a subroutine or service accessible to the compiler 120.

Generating the plurality of low-level functions may comprise performing a curve-fitting or other function generation to a plurality of data points comprising low-level metric values associated with one or more executions of the program 118. For example, the low-level metric values may correspond to executed instances of the program 118 based on various combinations of data parameter values (e.g., input or a workload for the instance of the program 118), hardware parameters (e.g., hardware configurations of computing devices executing the program 118) and program parameters (e.g., different distributions and allocations of data and computing resources for executing the program 118). Each generated function (e.g., each fit curve) would calculate, as input, one or more data parameter values, one or more hardware parameter values, and one or more program parameter values, and, as output, a low-level metric value.

The method of FIG. 2 may further comprise generating 206 one or more high-level metric functions 208 for one or more high-level metrics, each of the one or more high-level metric functions 208 comprising a piecewise-rational function based on one or more of the low-level metric functions. For example, a high-level metric function for calculating hardware occupancy may comprise a piecewise rational function of the low-level metric functions used to calculate the number of registers used per thread and the number of shared memory words used per thread block.

Generating the one or more high-level metric functions 208 may be based on an encoded representation, predefined representation, or other known representation of functional dependencies between low-level metrics and high-level metrics. In other words, the representation of these functional dependencies may calculate, as input, one or more low-level metric values and, as output, a high-level metric value. Accordingly, generating the one or more high-level metric functions 208 may comprise replacing, in a function, one or more low-level metric inputs with a corresponding low-level metric function 204.

Generating the one or more high-level metric functions 208 may comprise including or encoding the high-level metric functions in a parameter generation module 122 for optimizing program parameters in multithreaded programming. For example, generating the one or more high-level metric functions 208 may comprise generating, compiling, or otherwise encoding the parameter generation module 122 as a separate executable or subroutine configured to execute the one or more high-level functions 208. Generating the one or more high-level metric functions 208 may comprise generating, compiling, or otherwise encoding the parameter generation module 122 as a component of the program 118 (e.g., by compiling the program 118) configured execute the one or more high-level functions 208.

The method of FIG. 2 may further comprise generating 210 (e.g., by the program generation module 122), based on the one or more high-level metric functions 208 (e.g., generated by the function construction module 116), one or more data parameter values 212 (e.g., for a workload or input to the program 118), and one or more hardware parameter values 214 (e.g., describing a computer 102 executing the program 118 and the parameter generation module 122), one or more program parameter values 216 for executing the program 118, wherein the one or more program parameter values are configured to optimize the one or more high-level metrics.

The one or more high-level metrics may be selected by a user on execution of the program (e.g., as a user input). The one or more high-level metrics may also be predefined or selected as default high-level metrics that may be subsequently overridden (e.g., based on a user input, configuration, preference, etc.). Generating the one or more program parameter values 216 may comprise generating the one or more program parameters to minimize or maximize a high-level metric calculated by a respective high-level metric function 208. Whether the high-level metric should be minimized or maximized may depend on the high-level metric. For example, an execution time may be minimized, while a hardware occupancy may be maximized. Where the high-level metrics comprise a plurality of high-level metrics (e.g., the program parameter values 216 are generated to optimize a plurality of high-level metrics), the program parameter values 216 may be generated based on a weighting or tiering of importance of the high-level metrics, or according to other rules.

For example, assuming a high-level metric function H=f $(D_1\text{-}D_n, H_1\text{-}H_n, P_1\text{-}P_n)$, as $D_1\text{-}D_n$, $H_1\text{-}H_n$ are known at run-time of the program 118, the parameter generation module 122 may solve for program parameters 216 $P_1\text{-}P_n$ to maximize or minimize H. The resulting program parameter values provide for optimized execution of the program 118 for the specific hardware configuration and workload at runtime. The program 118 may then be executed using the generated program parameters (e.g., by the operating system 112). For example, the parameter generation module 122 may execute a kernel or operating system call indicating the generated program parameters. As another example, the parameter generation module 122 may provide the generated program parameters as arguments or other inputs to the program 118.

Figure 3:
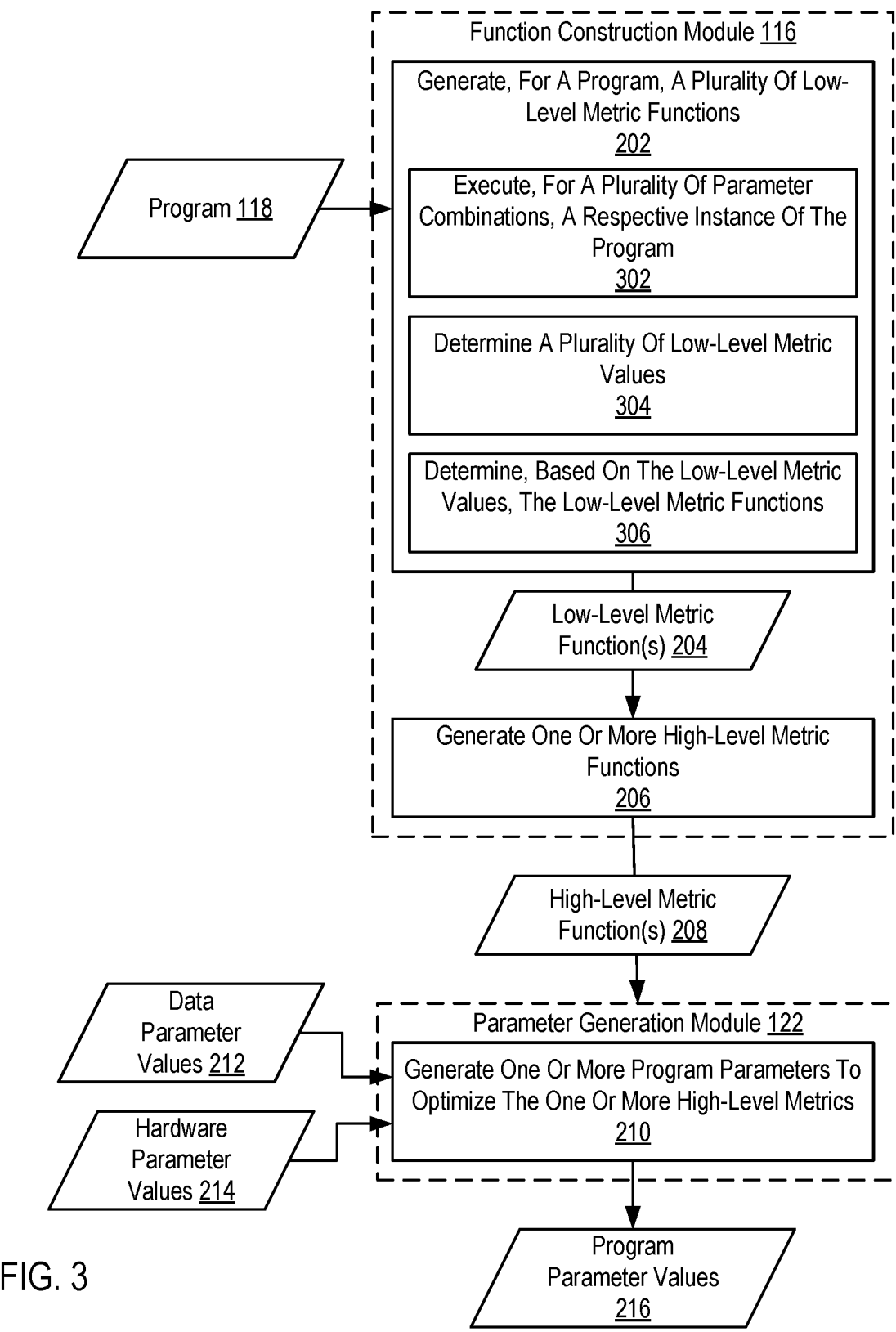
FIG. 3 is a flowchart of an example method for optimizing program parameters in multithreaded programming.

For further explanation, FIG. 3 sets forth a flow chart illustrating a further exemplary method for optimizing program parameters in multithreaded programming according to embodiments of the present invention that includes generating 202 (e.g., by a function construction module 116), for a program 118, a plurality of low-level metric functions 204, each of the low-level metric functions 204 calculating a respective low-level metric of a plurality of low-level metrics; generating 206 (e.g., by the function construction module 116) one or more high-level metric functions 208 for one or more high-level metrics, each of the one or more high-level metric functions 208 comprising a piecewise-rational function based on one or more of the low-level metric functions 204; and generating 210 (e.g., by the parameter generation module 122), based on the one or more high level-metric functions 208, one or more data parameter values 212 and one or more hardware parameter values 214, one or more program parameter values 216 for executing the program 118, wherein the one or more program parameter values 216 are configured to optimize the one or more high-level metrics.

The method of FIG. 3 differs from FIG. 2 in that generating 202, for a program 118, a plurality of low-level metric functions 204 comprises executing 302, for a plurality of parameter combinations, a respective instance of the program 118. Each of the plurality of parameter combinations may comprise a distinct combination of data parameters, hardware parameters, and program parameters for executing the instance of the program. The plurality of parameter combinations may be randomly generated, selected from a pool of predefined parameter combinations, or otherwise determined. For example, determining the plurality of parameter combinations may be based on one or more data parameter descriptions. The one or more data parameter descriptions may indicate one or more attributes or constraints for data parameter values. Thus, the data parameter values in the plurality of parameter combinations may be determined (e.g., automatically generated) according to these attributes or constraints of the data parameter descriptions. Examples of data parameter descriptions may include dimensionality of data (e.g., 1-dimensional, 2-dimensional), types of data (e.g., integers, floats, doubles), ranges of data (e.g., a range of numbers), and sparseness of data (e.g., sparse or non-sparse).

Executing, for the plurality of parameter combinations, a respective instance of the program may comprise emulating one or more computing devices comprising different emulated hardware configurations (e.g., different emulated hardware configurations corresponding to the hardware parameter values of the parameter combinations). Thus, the program 118 will be executed for each of the emulated hardware configurations according to the parameter combinations. Executing a respective instance of the program may comprise compiling (e.g., by the compiler 120) the program 118 into an intermediate representation for execution (e.g., by an emulated instance of a computing device).

The method of FIG. 3 further differs from FIG. 2 in that generating 202, for the program 118, the plurality of low-level metric functions 204 further comprises determining 304, for each respective instance of the program 118, a plurality of low-level metric values for the plurality of low-level metrics. For example, the function construction module 116 can sample (e.g., during execution of the program 118) or calculate (e.g., after execution of the program 118) the plurality of low-level metric values.

The method of FIG. 3 further differs from FIG. 2 in that generating 202, for the program 118, the plurality of low-level metric functions 204 further comprises determining 306, based on each of the plurality of low-level metric values, the plurality of low-level metric functions 204. As an example, for a given low-level metric, the low-level metric values can be mapped or graphed to the program parameter values, data parameter values, and hardware parameter values (e.g., the parameter combinations) used to execute the respective instance of the program. A function can then be mapped (e.g., using numeric analysis, curve fitting, or rational interpolation) to the sampled or calculated low-level metric values to generate a low-level metric function 204.

Figure 4:
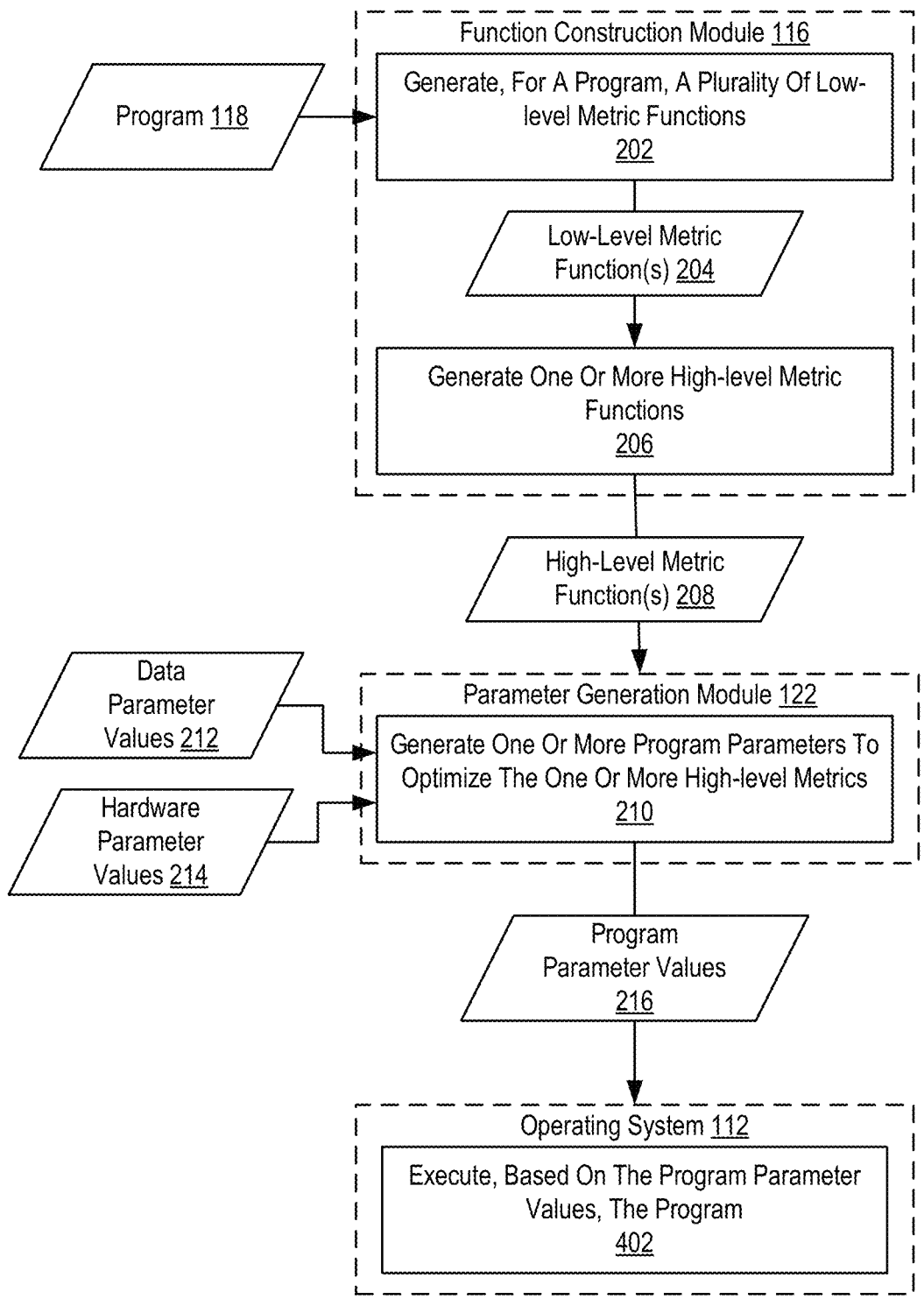
FIG. 4 is a flowchart of an example method for optimizing program parameters in multithreaded programming.

For further explanation, FIG. 4 sets forth a flow chart illustrating a further exemplary method for optimizing program parameters in multithreaded programming according to embodiments of the present invention that includes generating 202 (e.g., by a function construction module 116), for a program 118, a plurality of low-level metric functions 204, each of the low-level metric functions 204 calculating a respective low-level metric of a plurality of low-level metrics; generating 206 (e.g., by the function construction module 116) one or more high-level metric functions 208 for one or more high-level metrics, each of the one or more high-level metric functions 208 comprising a piecewise-rational function based on one or more of the low-level metric functions 204; and generating 210 (e.g., by the parameter generation module 122), based on the one or more high level-metric functions 208, one or more data parameter values 212 and one or more hardware parameter values 214, one or more program parameter values 216 for executing the program 118, wherein the one or more program parameter values 216 are configured to optimize the one or more high-level metrics.

The method of FIG. 4 differs from FIG. 2 in that the method of FIG. 4 further comprises executing 402 (e.g., by the operating system 112), based on the program parameter values 216, the program 118. For example, the program parameter values 216 may be generated in response to an initialization or execution of the program 118 (e.g., by a parameter generation module 122 comprising a subroutine or separate executable called by or in conjunction with the program 118). The program parameter values 216 may then be passed to the operating system 112 as arguments for execution of the program 118. The program parameter values 216 may then be passed to the kernel or another resource for allocation of data and programming resources according to the program parameter values 216.

Figure 5:
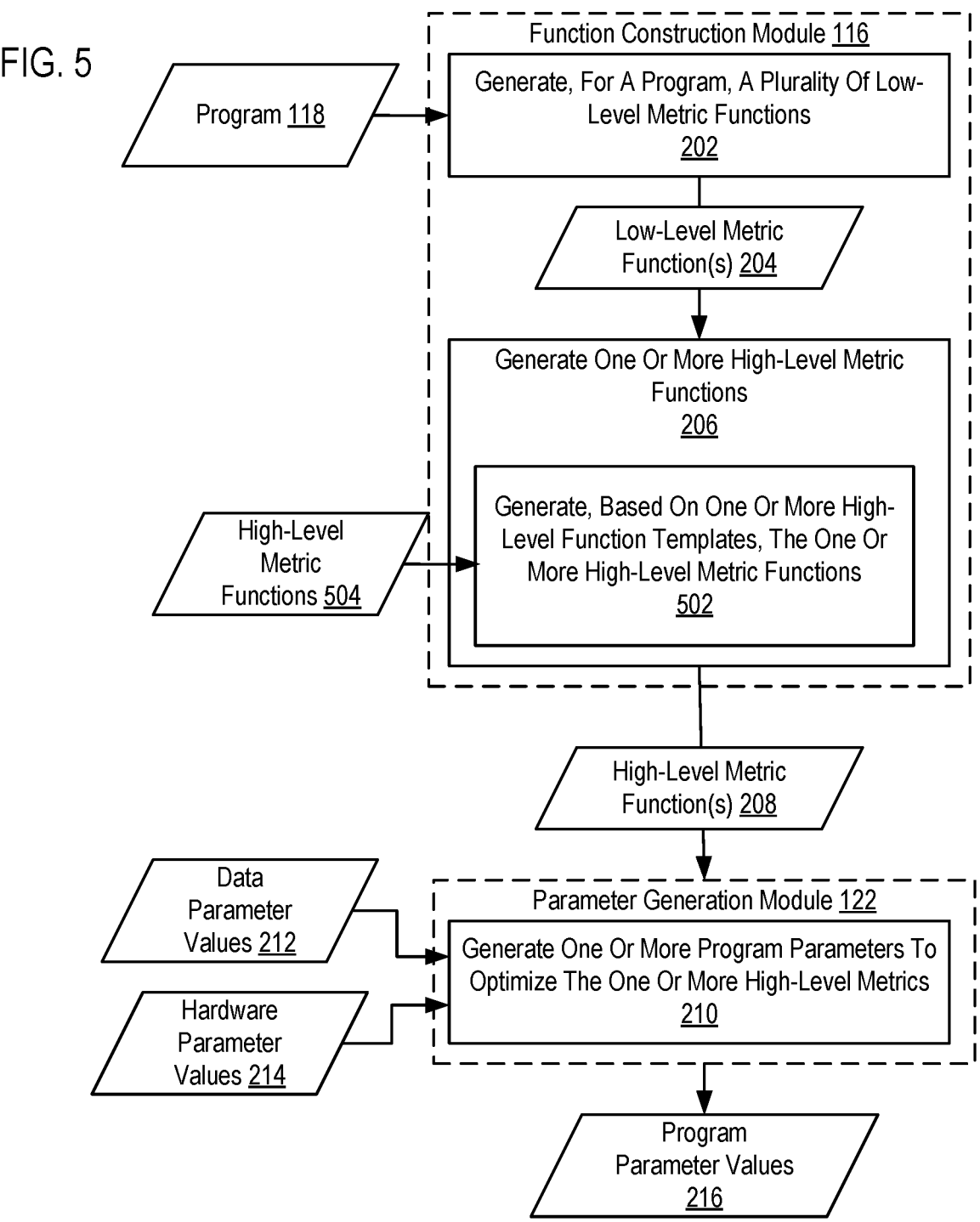
FIG. 5 is a flowchart of an example method for optimizing program parameters in multithreaded programming.

For further explanation, FIG. 5 sets forth a flow chart illustrating a further exemplary method for optimizing program parameters in multithreaded programming according to embodiments of the present invention that includes generating 202 (e.g., by a function construction module 116), for a program 118, a plurality of low-level metric functions 204, each of the low-level metric functions 204 calculating a respective low-level metric of a plurality of low-level metrics; generating 206 (e.g., by the function construction module 116) one or more high-level metric functions 208 for one or more high-level metrics, each of the one or more high-level metric functions 208 comprising a piecewise-rational function based on one or more of the low-level metric functions 204; and generating 210 (e.g., by the parameter generation module 122), based on the one or more high level-metric functions 208, one or more data parameter values 212 and one or more hardware parameter values 214, one or more program parameter values 216 for executing the program 118, wherein the one or more program parameter values 216 are configured to optimize the one or more high-level metrics.

The method of FIG. 5 differs from FIG. 2 in that generating 206 one or more high-level metric functions 208 comprises generating 502, based on one or more high-level function templates 504, the one or more high-level metric functions. A high-level function template 504 may describe the functional relationship (e.g., dependencies) of low-level metrics on high-level metrics. For example, a high-level metric H may be expressed using the function $H=f(L_1 \ldots L_n)$, where $L_1$-$L_n$ are low-level metric values. The high-level function template may express this functional relationship independent of a particular program 118. Accordingly, generating a high-level metric function may comprise substituting the low-level metric values $L_1$-$L_n$ with the generated low-level metric functions 204 generated specific to the program 118. Thus, the resulting high-level metric function 208 is specific to the program 118 and accepts, as input, one or more hardware parameter values, one or more data parameter values, and one or more program parameter values and calculates, as output, a high-level metric value.

For further explanation, FIG. 6 sets forth a flow chart illustrating a further exemplary method for optimizing program parameters in multithreaded programming according to embodiments of the present invention that includes generating 202 (e.g., by a function construction module 116), for a program 118, a plurality of low-level metric functions 204, each of the low-level metric functions 204 calculating a respective low-level metric of a plurality of low-level metrics; generating 206 (e.g., by the function construction module 116) one or more high-level metric functions 208 for one or more high-level metrics, each of the one or more high-level metric functions 208 comprising a piecewise-rational function based on one or more of the low-level metric functions 204; and generating 210 (e.g., by the parameter generation module 122), based on the one or more high level-metric functions 208, one or more data parameter values 212 and one or more hardware parameter values 214, one or more program parameter values 216 for executing the program 118, wherein the one or more program parameter values 216 are configured to optimize the one or more high-level metrics.

The method of FIG. 6 differs from FIG. 2 in that the method of FIG. 6 further comprises configuring 602 (e.g., by the compiler 120) the program to execute the one or more high-level functions. For example, the compiler 120 may include, in a compiled instance of the program 118, code, service calls, Application Program Interface (API) calls, or other executable instructions configured to execute the one or more high-level functions 208 on execution of the program 118. Source code for the program 118 may already include the code configured to execute the one or more high-level functions 208. For example, a developer or distributor of the code for the program may execute the function construction module 116 to generate the high-level functions 208, which may then be encoded (e.g., automatically by the function construction module 116 or manually) in the source code for the program 118. Thus, generating 210 the one or more program parameter values 216 may be performed by a parameter generation module 122 that is a component of or is referenced by a compiled instance of the program 118.

In view of the explanations set forth above, readers will recognize that the benefits of optimizing program parameters in multithreaded programming according to embodiments of the present invention include:

Program parameter values optimizing the execution of a program can be determined at run-time using parameters that may only be determined at run-time, including data parameter values for the workload of the program and hardware parameter values for the computing system executing the program.

As hardware parameters are treated as symbolic values of the low-level metric functions and the high-level metric functions, the approaches described herein may be applied to any potential hardware configuration. Moreover, the generated low-level metric functions and high-level metric functions, including the parameter construction module 122, may be executed on any hardware configuration independent of the system used to generate the functions themselves.

Embodiments where generating the plurality of low-level metric functions comprises: executing, for a plurality of parameter combinations, a respective instance of the program; determining, for each respective instance of the program, a plurality of low-level metric values for the plurality of low-level metrics; and determining, based on each plurality of low-level metric values, the plurality of low-level metric functions provides the advantage of being able to generate, on a single system, low-level metric functions and high-level metric functions based on many possible configurations without the need for input training data.

Embodiments comprising determining the plurality of parameter combinations based on one or more data parameter descriptions allow for low-level metric functions and high-level metric functions to be generated without actual input data parameter values. Instead, the functions can be generated using only descriptions of what data would be acted on. Thus provides advantages where a program may use sensitive or potentially confidential data, allowing the program to be optimized without exposing this potentially sensitive or confidential information.

Embodiments where generating the one or more high-level functions comprises generating, based on one or more high-level function templates, the one or more high-level functions provides the advantage of using known parameter-independent relationships between low-level metrics and high-level metrics to generate parameter-dependent high-level metric functions for optimizing program parameter values.

Exemplary embodiments of the present invention are described largely in the context of a fully functional computer system for optimizing program parameters in multithreaded programming. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of optimizing program parameters at runtime in multithreaded programming, the method comprising:
generating, by a function construction module, for a program, a plurality of low-level metric functions, wherein each low-level metric function of the plurality of low-level metric functions calculates a respective low-level metric of a plurality of low-level metrics;
generating, by the function construction module, one or more high-level metric functions for one or more high-level metrics, wherein each high-level metric function of the one or more high-level metric functions comprises a piecewise-rational function based on one or more of the plurality of low-level metric functions; and
generating, by a parameter generation module, based on the one or more high-level metric functions and one or more data parameter values determined at run-time and one or more hardware parameter values determined at run-time, one or more program parameter values at run-time to optimize an execution of the program, wherein the one or more program parameter values are configured to optimize the one or more high-level metrics.

2. The method of claim 1, wherein generating the plurality of low-level metric functions comprises:
executing, for a plurality of parameter combinations, a respective instance of the program;
determining, for each respective instance of the program, a plurality of low-level metric values for the plurality of low-level metrics; and
determining, based on each low-level metric value of the plurality of low-level metric values, the plurality of low-level metric functions.

3. The method of claim 2, wherein determining, based on each low-level metric value of the plurality of low-level metric values, the plurality of low-level metric functions is based on one or more of a numeric analysis or a rational interpolation.

4. The method of claim 2, wherein executing, for the plurality of parameter combinations, the respective instance of the program comprises emulating one or more computing devices comprising different emulated hardware configurations.

5. The method of claim 2, further comprising determining the plurality of parameter combinations based on one or more data parameter descriptions.

6. The method of claim 1, further comprising configuring, by a compiler, the program to execute the one or more high-level metric functions.

7. The method of claim 1, wherein generating the one or more high-level metric functions comprises generating, based on one or more high-level function templates, the one or more high-level metric functions.

8. An apparatus for optimizing program parameters at run-time in multithreaded programming, the apparatus comprising a computer processor and a computer memory operatively coupled to the computer processor, the computer memory having stored within it computer program instructions that, when executed by the computer processor, cause the apparatus to perform the steps of:
generating, by a function construction module, for a program, a plurality of low-level metric functions, wherein each low-level metric function of the plurality of low-level metric functions calculates a respective low-level metric of a plurality of low-level metrics;
generating, by the function construction module, one or more high-level metric functions for one or more high-level metrics, wherein each high-level metric function of the one or more high-level metric functions comprises a piecewise-rational function based on one or more of the plurality of low-level metric functions; and
generating, by a parameter generation module, based on the one or more high-level metric functions and one or more data parameter values determined at run-time and one or more hardware parameter values determined at run-time, one or more program parameter values at run-time to optimize an execution of the program, wherein the one or more program parameter values are configured to optimize the one or more high-level metrics.

9. The apparatus of claim 8, wherein generating the plurality of low-level metric functions comprises:
executing, for a plurality of parameter combinations, a respective instance of the program;
determining, for each respective instance of the program, a plurality of low-level metric values for the plurality of low-level metrics; and
determining, based on each low-level metric value of the plurality of low-level metric values, the plurality of low-level metric functions.

10. The apparatus of claim 9, wherein determining, based on each low-level metric value of the plurality of low-level metric values, the plurality of low-level metric functions is based on one or more of a numeric analysis or a rational interpolation.

11. The apparatus of claim 9, wherein executing, for the plurality of parameter combinations, the respective instance of the program comprises emulating one or more computing devices comprising different emulated hardware configurations.

12. The apparatus of claim 9, wherein the steps further comprise determining the plurality of parameter combinations based on one or more data parameter descriptions.

13. The apparatus of claim 8, wherein the steps further comprise configuring, by a compiler, the program to execute the one or more high-level metric functions.

14. The apparatus of claim 8, wherein generating the one or more high-level metric functions comprises generating, based on one or more high-level function templates, the one or more high-level metric functions.

15. A computer program product for optimizing program parameters at run-time in multithreaded programming, the computer program product being stored within a computer readable storage medium, the computer program product comprising computer program instructions that, when executed by a computer, cause the computer to perform the steps of:
generating, by a function construction module, for a program, a plurality of low-level metric functions, wherein each low-level metric function of the plurality of low-level metric functions calculates a respective low-level metric of a plurality of low-level metrics;
generating, by the function construction module, one or more high-level metric functions for one or more high-level metrics, wherein each high-level metric function of the one or more high-level metric functions comprises a piecewise-rational function based on one or more of the plurality of low-level metric functions; and
generating, by a parameter generation module, based on the one or more high-level metric functions and one or more data parameter values determined at run-time and one or more hardware parameter values determined at run-time, one or more program parameter values at run-time to optimize an execution of the program, wherein the one or more program parameter values are configured to optimize the one or more high-level metrics.

16. The computer program product of claim 15, wherein generating the plurality of low-level metric functions comprises:
executing, for a plurality of parameter combinations, a respective instance of the program;
determining, for each respective instance of the program, a plurality of low-level metric values for the plurality of low-level metrics; and
determining, based on each low-level metric value of the plurality of low-level metric values, the plurality of low-level metric functions.

17. The computer program product of claim 16, wherein determining, based on each low-level metric value of the plurality of low-level metric values, the plurality of low-level metric functions is based on one or more of a numeric analysis or a rational interpolation.

18. The computer program product of claim 16, wherein executing, for the plurality of parameter combinations, the respective instance of the program comprises emulating one or more computing devices comprising different emulated hardware configurations.

19. The computer program product of claim 16, wherein the steps further comprise determining the plurality of parameter combinations based on one or more data parameter descriptions.

20. The computer program product of claim 15, wherein the steps further comprise configuring, by a compiler, the program to execute the one or more high-level metric functions.

* * * * *